(12) United States Patent
Chen

(10) Patent No.: US 11,662,776 B2
(45) Date of Patent: May 30, 2023

(54) PROTECTIVE WRAP FOR HANDHELD COMPUTER

(71) Applicant: Yu-Pao Chen, New Taipei (TW)

(72) Inventor: Yu-Pao Chen, New Taipei (TW)

( * ) Notice: Subject to any disclaimer, the term of this patent is extended or adjusted under 35 U.S.C. 154(b) by 0 days.

(21) Appl. No.: 17/159,472

(22) Filed: Jan. 27, 2021

(65) Prior Publication Data

US 2022/0236770 A1 Jul. 28, 2022

(51) Int. Cl.
*H04M 1/18* (2006.01)
*H04B 1/3888* (2015.01)
*G06F 1/16* (2006.01)
*A45C 11/00* (2006.01)

(52) U.S. Cl.
CPC ............ *G06F 1/1656* (2013.01); *A45C 11/00* (2013.01); *A45C 2011/003* (2013.01); *G06F 2200/1633* (2013.01)

(58) Field of Classification Search
CPC ........... G06F 1/1656; G06F 2200/1633; A45C 11/00; A45C 2011/003; H04B 1/3888; H04M 1/0283; H04M 1/185
See application file for complete search history.

(56) References Cited

U.S. PATENT DOCUMENTS

| | | | | |
|---|---|---|---|---|
| 2009/0020570 | A1* | 1/2009 | Chan | A45F 5/00 224/222 |
| 2013/0199950 | A1* | 8/2013 | Feller | H05K 5/03 156/247 |
| 2014/0037897 | A1* | 2/2014 | Wyner | A45C 3/001 428/138 |
| 2014/0200055 | A1* | 7/2014 | Cheng | H04M 1/0283 455/575.8 |
| 2014/0360892 | A1* | 12/2014 | Lin | A45C 13/008 206/37 |
| 2017/0112249 | A1* | 4/2017 | Peterson | G06F 1/1628 |
| 2017/0293321 | A1* | 10/2017 | Rosen | B44C 1/00 |
| 2021/0048847 | A1* | 2/2021 | Fenton | G06F 1/1628 |
| 2022/0040909 | A1* | 2/2022 | Webster | B29C 63/0004 |
| 2022/0272186 | A1* | 8/2022 | Wang | H04M 1/0269 |

* cited by examiner

*Primary Examiner* — Andrew Wendell
(74) *Attorney, Agent, or Firm* — Ted Masters

(57) ABSTRACT

A protective wrap for a handheld computer has a covering film, four corner wrapping sheets, and two connecting sheets. The corner wrapping sheets are disposed on a lower surface of the covering film and are placed at the four corners of the covering film respectively. Each of the connecting sheets are connected to and extend between two of the corner wrapping sheets. When the protective wrap is fixed on a fixture, the corner of the covering film does not turn inside out arbitrarily. Thus, patterns can be properly printed on the covering film with unprinted areas for revealing letters, numbers and symbols on keys of the keyboard formed at precise positions on the covering film.

12 Claims, 5 Drawing Sheets

PROTECTIVE WRAP FOR HANDHELD COMPUTER

BACKGROUND OF THE INVENTION

1. Field of the Invention

The present invention relates to a protective wrap for a handheld computer, especially to a protective wrap that is used to cover a keyboard of a laptop or a tablet computer.

2. Description of the Prior Art(s)

In addition to clean a keyboard regularly, a fundamental way to keep the keyboard clean is to cover the keyboard with a film cover at the first step, so as to prevent dust, such as crumbs, hairs, staples or the like, from dropping into and being trapped in the keyboard.

A conventional film cover for a laptop is formed as a thin sheet. Since the conventional film cover is just placed on a keyboard of the laptop without any connecting structure therebetween, the conventional film cover is displaced easily. In order to prevent the conventional film cover from being displaced, a position of the conventional film on the keyboard of the laptop may be fixed via double-sided tapes. However, the double-sided tapes make it troublesome to remove and replace the conventional film cover and residue might be left on the keyboard and the conventional film cover after removal of the double sided tapes.

FIGS. 4 and 5 disclose a prior art protective wrap 50 for a handheld computer, such as a laptop 60 or a tablet computer. The protective wrap 50 comprises a covering film 51 and four corner wrapping sheets 52. The covering film 51 is used to cover on a keyboard that is mounted on an upper surface of a lower base 61 of the laptop 60 or a screen of the tablet computer. The corner wrapping sheets 52 are disposed on a lower surface of the covering film 51 and are placed at four corners 511 of the covering film 51 respectively.

Take wrapping the lower base 61 of the laptop 60 as an example. The covering film 51 covers on the keyboard and four corners of the lower base 61 of the laptop 60 are wrapped by the four corner wrapping sheets 52. In order to allow the protective wrap 50 to be distinctive, the covering film 51 may be printed with patterns. Among the patterns, multiple unprinted areas may be formed. The unprinted areas correspond in position and shapes to letters, numbers and symbols printed on keys of the keyboard for revealing the letters, the numbers and the symbols on the keys.

When printing the patterns on the covering film 51, the protective wrap 50 is fixed on a fixture by mounting the four corner wrapping sheets 52 around four parts of the fixture respectively. The fixture straighten the covering film 51, such that the patterns can be printed on the covering film 51.

However, since the corner wrapping sheet 52 are individually disposed on the covering film 51, some of the corners of the covering film 51, on which the corner wrapping sheets 52 is disposed, turn inside out easily when the protective wrap 50 is fixed on the fixture. Moreover, the protective wrap 50 is displaced easily and the covering film 51 wrinkles easily. Consequently, the patterns cannot be properly printed on the covering film 51, and the unprinted areas for revealing the letters, the numbers and the symbols on the keys of the keyboard would be unable to be formed at precise positions on the covering film 51.

To overcome the shortcomings, the present invention provides a protective wrap for a handheld computer to mitigate or obviate the aforementioned problems.

SUMMARY OF THE INVENTION

The main objective of the present invention is to provide a protective wrap for a handheld computer. The protective wrap has a covering film, four corner wrapping sheets, and two connecting sheets.

The covering film has two first side edges oppositely defined on the covering film, two second side edges oppositely defined on the covering film and four corners. Each of the corners is defined between one of the first side edges and one of the second side edges.

The four corner wrapping sheets are disposed on a lower surface of the covering film and are placed at the four corners of the covering film respectively. Each of the corner wrapping sheets has two attaching edges. The attaching edges are positioned toward one of the first side edges of the covering film and one of the second side edges of the covering film that define the corner at which the corner wrapping sheet is placed, and are attached to the covering film.

The two connecting sheets are disposed on the lower surface of the covering film. Each of the connecting sheets are connected to and extend between two of the corner wrapping sheets that are disposed along the same second side edge of the covering film.

When the protective wrap is fixed on a fixture for printing patterns on the covering film, with each of the connecting sheets connecting two of the corner wrapping sheets, the corner of the covering film does not turn inside out arbitrarily. Moreover, the protective wrap is not displaced easily and the covering film does not wrinkle easily. Accordingly, the patterns can be properly printed on the covering film with unprinted areas for revealing letters, numbers and symbols on keys of the keyboard formed at precise positions on the covering film.

With the protective wrap of the present invention wrapping the lower base of the laptop, viruses, water stains, dust, crumbs on the covering film can be cleaned easily. In addition, even a vacuum cleaner is used for cleaning, the protective wrap is not removed by powerful suction of the vacuum cleaner.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
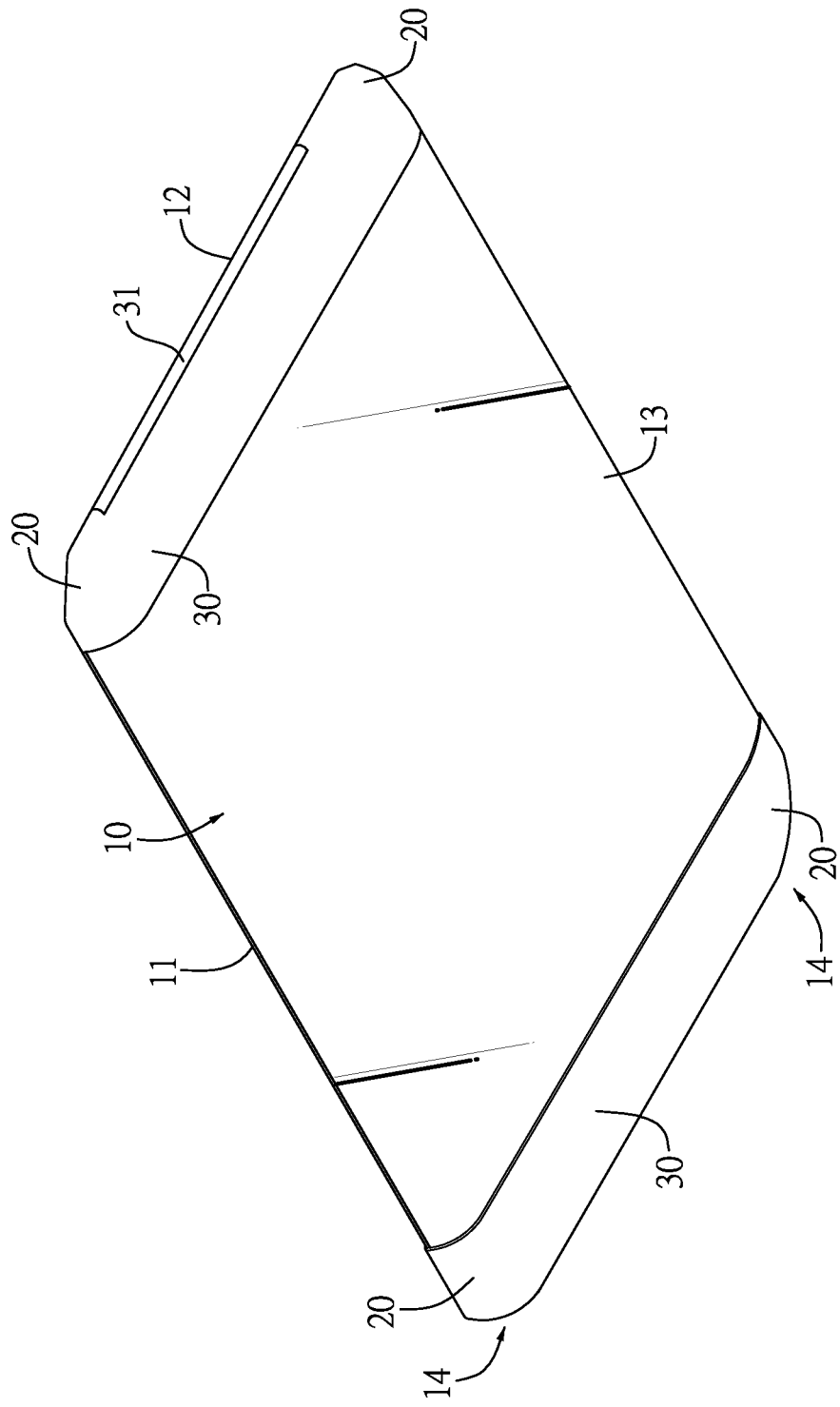
FIG. 1 is a bottom perspective view of a protective wrap for a handheld computer in accordance with the present invention.
Figure 2:
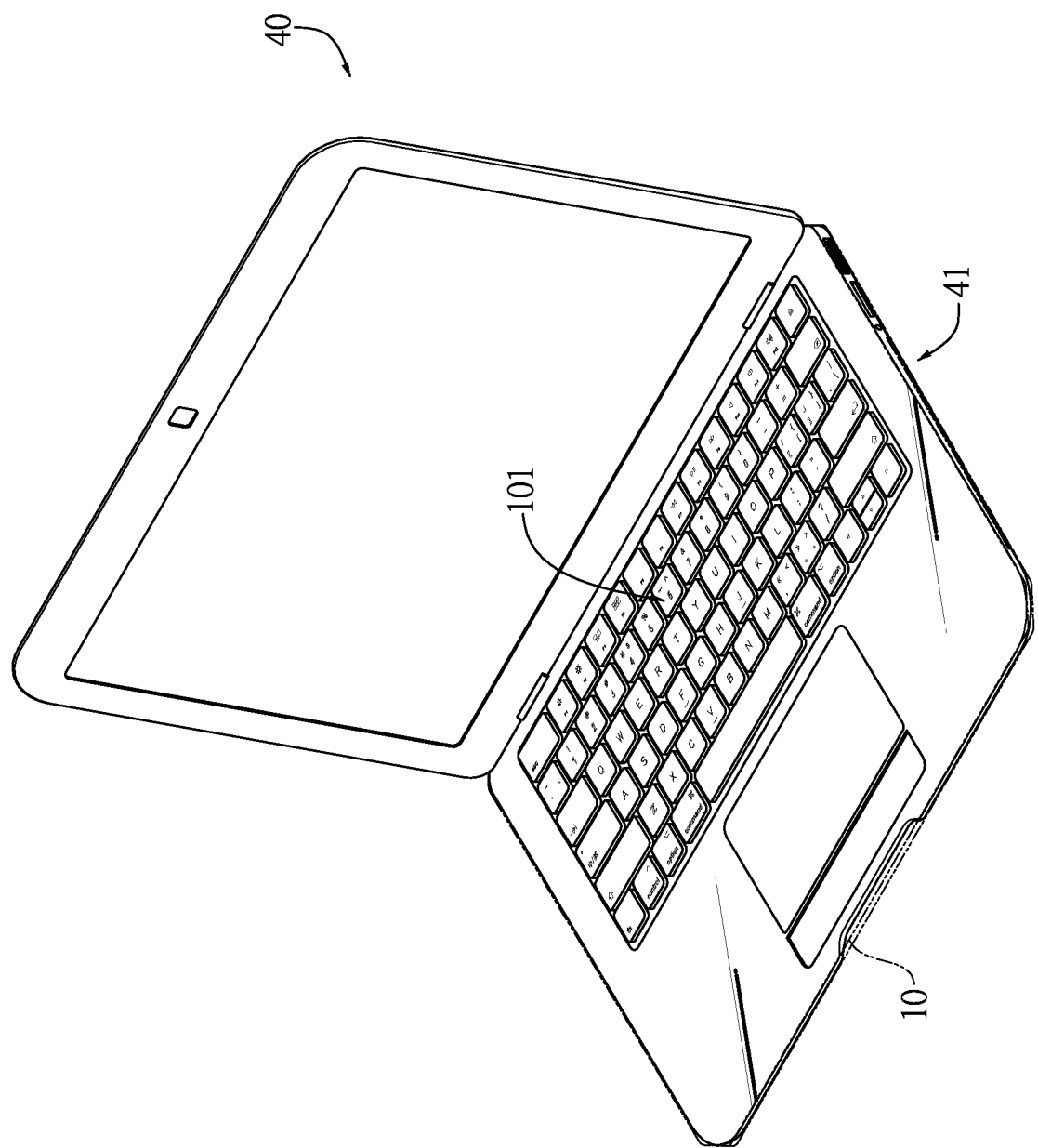
FIG. 2 is an operational top perspective view of the protective wrap in FIG. 1, showing the protective wrap wrapping on a laptop.

With reference to FIGS. 1 and 2, a protective wrap in accordance with the present invention is used to be wrapped on a handheld computer, such as being wrapped on a lower base 41 of a laptop 40 or a tablet computer. In this preferred embodiment, wrapping the lower base 41 of the laptop 40 in the protective wrap is taken as an example and a keyboard is mounted on an upper surface of the lower base 41 of the laptop 40. The protective wrap comprises a covering film 10, four corner wrapping sheets 20, and two connecting sheets 30.

The covering film 10 may be substantially rectangular in shape, is used to cover on the keyboard on the lower base 41 of the laptop 40, and may be printed with patterns 101. The covering film 10 has a lower surface 13, two first side edges 11, two second side edges 12 and four corners 14. The two first side edges 11 are oppositely defined on the covering film 10. The two second side edges 12 are oppositely defined on the covering film 10. The four corners 14 are separately defined on the covering film 10. Each of the corners 14 is defined between one of the first side edges 11 and one of the second side edges 12.

The four corner wrapping sheets 20 are disposed on the lower surface 13 of the covering film 10 and are placed at the four corners 14 of the covering film 10 respectively. Each of the corner wrapping sheets 20 has two attaching edges. The attaching edges are positioned toward one of the first side edges 11 of the covering film 10 and one of the second side edges 12 of the covering film 10 that define the corner 14 at which the corner wrapping sheet 20 is placed, and are attached to the covering film 10.

In the preferred embodiment, each of the corner wrapping sheets 20 is rectangular in shape and the two attaching edges of the corner wrapping sheet 20 are respectively disposed along a corresponding one of the first side edges 11 and a corresponding one of the second side edges 12 of the covering film 10. Otherwise, each of the corner wrapping sheets may be an elongated strip and extends between the corresponding first side edge 11 and the corresponding second side edge 12 of the covering film 10.

Figure 3:
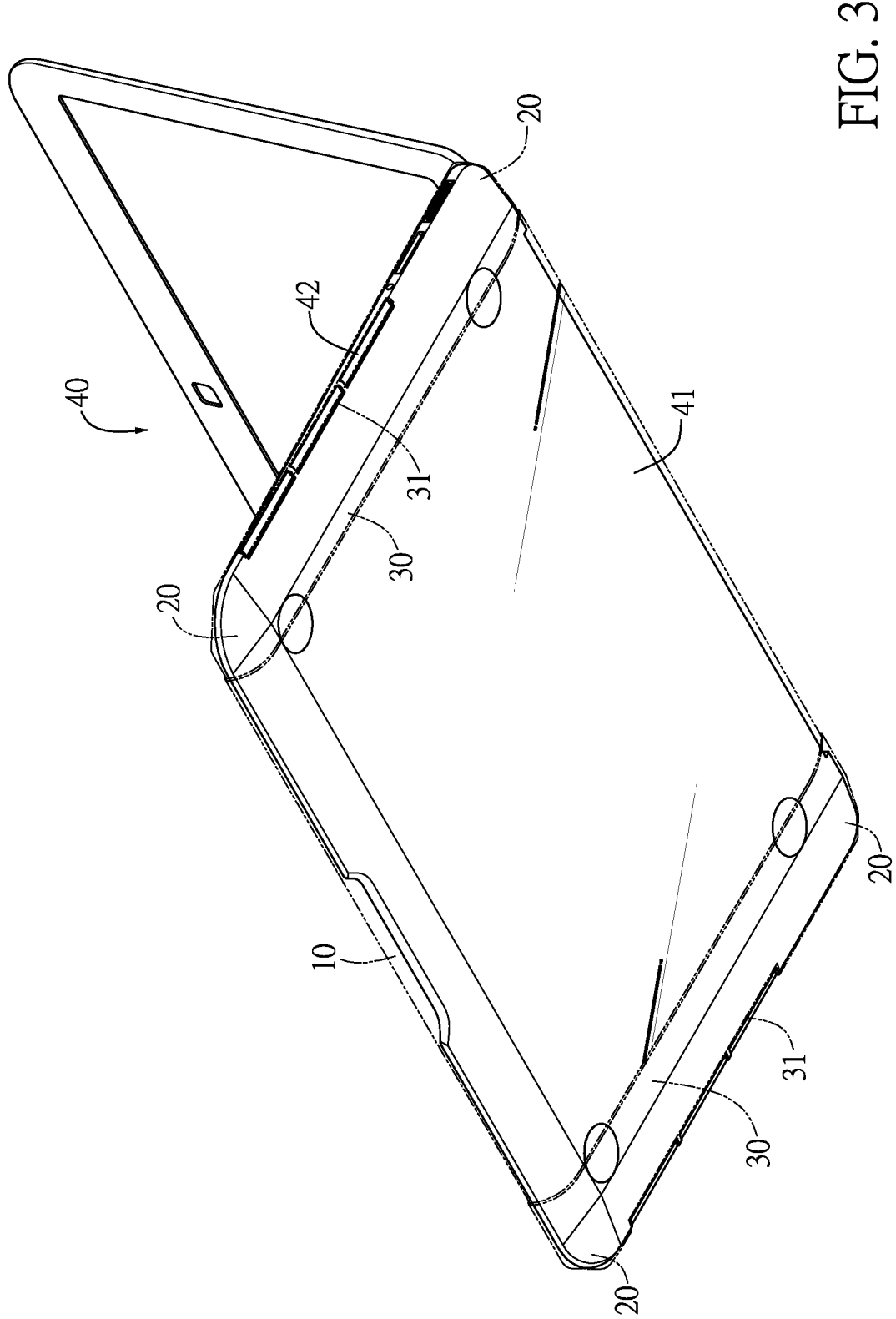
FIG. 3 is an operational bottom perspective view of the protective wrap in FIG. 1, showing the protective wrap wrapping on the laptop.
Figure 4:
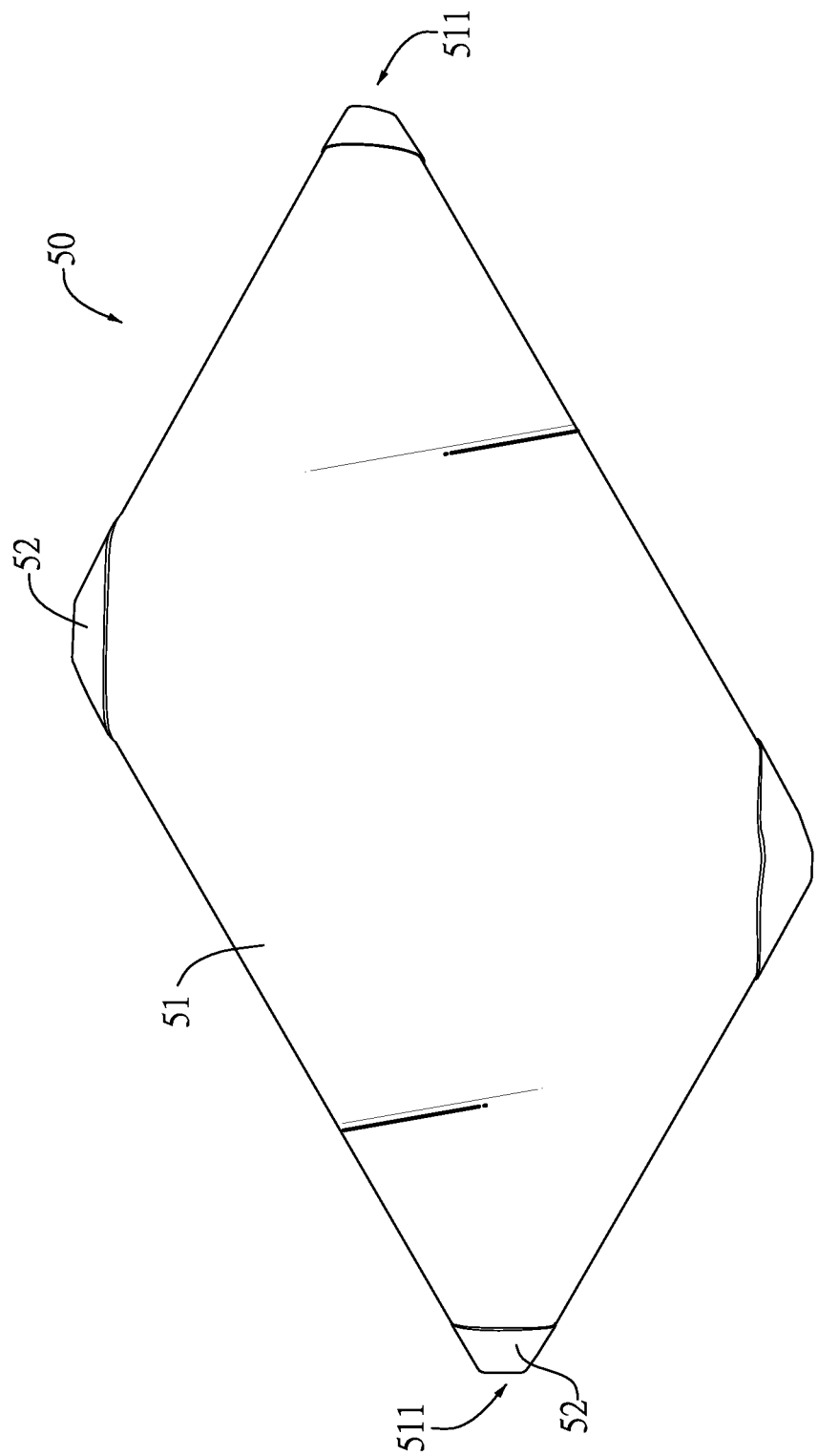
FIG. 4 is a bottom perspective view of a protective wrap for a handheld computer in accordance with the prior art.
Figure 5:
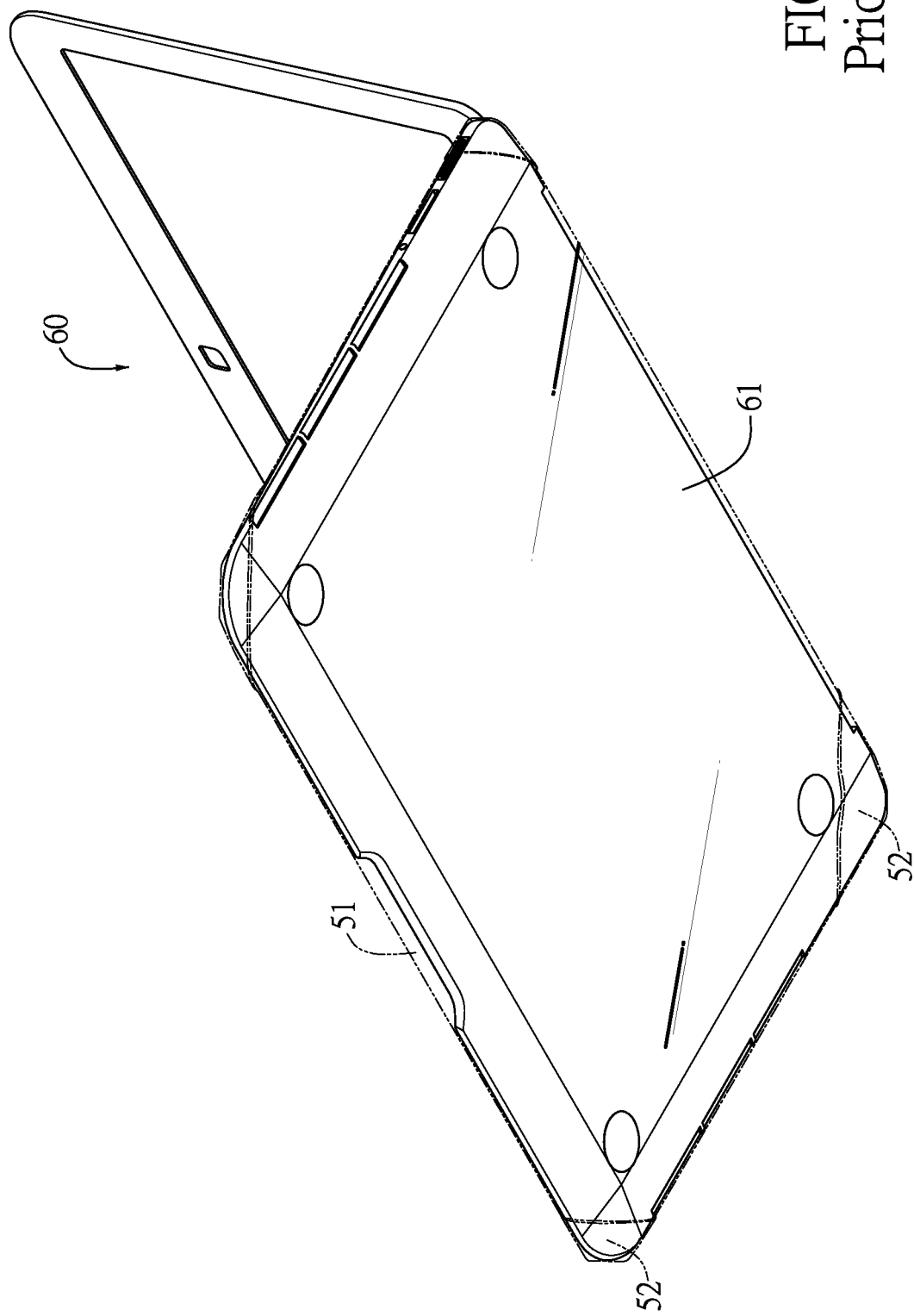
FIG. 5 is an operational bottom perspective view of the protective wrap in FIG. 4, showing the protective wrap wrapping on a laptop.

With further reference to FIG. 3, the two connecting sheets 30 are disposed on the lower surface 13 of the covering film 10. Each of the connecting sheets 30 is connected to and extends between two of the corner wrapping sheets 20 that are disposed along the same second side edge 12 of the covering film 10. Thus, the two connecting sheets 30 extend along the two second side edges 12 of the covering film 10 respectively.

When wrapping the lower base 41 of the laptop 40 in the protective wrap of the present invention, the covering film 10 covers on the keyboard on the lower base 41, four corners of the lower base 41 are wrapped in the four corner sheets 20, and the two connecting sheets 30 are settled on a lower surface of the lower base 41 of the laptop 40.

Preferably, at least one of the two connecting sheets 30 has a through hole 31 formed through the connecting sheet 30. The through hole 31 corresponds in position to at least one heat dissipation hole 42 on the lower surface of the lower base 41 of the laptop 40, such that the connecting sheet 30 does not cover the at least one heat dissipation hole 42 and the laptop 40 can dissipate heat as usual. In the preferred embodiment, the through hole 31 is elongated and extends toward the two first side edges 11 of the covering film 10 for exposing one elongated heat dissipation hole 42.

The protective wrap for the) handheld computer as described has the following advantages. When printing the patterns 101 on the covering film 10, the protective wrap is fixed on a fixture with the four corner wrapping sheets 20 mounted around four parts of the fixture respectively. Since each of the connecting sheets 30 connects two of the corner wrapping sheets 20, the corner 14 of the covering film 10, on which the corner wrapping sheets 20 are disposed, does not turn inside out arbitrarily. Moreover, the protective wrap is not displaced easily and the covering film 10 does not wrinkle easily. Accordingly, the patterns 101 can be properly printed on the covering film 10 with unprinted areas for revealing letters, numbers and symbols on keys of the keyboard formed at precise positions on the covering film 10.

With the protective wrap of the present invention wrapping the lower base 41 of the laptop 40, viruses, water stains, dust, crumbs on the covering film 10 can be cleaned easily. In addition, even a vacuum cleaner is used for cleaning, the protective wrap is not removed by powerful suction of the vacuum cleaner.

In FIGS. 2 and 3 it is noted that covering film 10 is positioned to cover the upper surface of the handheld computer 40. It is also noted that four corner sheets 20 are positioned to abut the lower surface of the handheld computer 40. And finally it is noted that two connecting sheets are positioned to abut the lower surface of the handheld computer 40.

In FIGS. 2 and 3 it is noted that handheld computer 40 has a first end and an opposite second end. The covering film 10 in combination with two of the corner sheets 20 and one connecting sheet 40 form a first pocket which is shaped and dimensioned to receive the first end of the handheld computer 40, wherein the two corner sheets 20 and the one connecting sheet are positionable to abut the lower surface of the handheld computer. The covering film 10 and the other two corner sheets 20 and the other connecting sheet 30 form a second pocket which is shaped and dimensioned to receive the second end of the handheld computer 40 wherein the other two corner sheets 20 and the other connecting sheet 30 are positionable to abut the lower surface of the handheld computer 40.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A protective wrap for a handheld computer, the handheld computer having an upper surface upon which a keyboard is disposed, and an opposite lower surface, the protective wrap comprising:
    a covering film having two first side edges oppositely defined on said covering film, two second side edges oppositely defined on said covering film and four corners, and each of said corners defined between one of said first side edges and one of second side edges;
    said covering film positionable to cover the upper surface of the handheld computer;
    four corner wrapping sheets disposed on a lower surface of said covering film and placed at said four corners of said covering film respectively;

said four corner wrapping sheets positionable to abut the lower surface of the handheld computer; each of said corner wrapping sheets having two attaching edges; said attaching edges positioned toward one of said first side edges of said covering film and one of said second side edges of said covering film that define said corner at which said corner wrapping sheet is placed, and are attached to said covering film;

two connecting sheets disposed on said lower surface of said covering film, and each of said connecting sheets connected to and extending between two of said corner wrapping sheets that are disposed along the same said second side edge of said covering film; and, said two connecting sheets positionable to abut the lower surface of the handheld computer.

2. The protective wrap as claimed in claim 1, wherein at least one of said two connecting sheets has a through hole formed through said connecting sheet.

3. The protective wrap as claimed in claim 2, wherein said through hole of said connecting sheet is elongated and extends between said two first side edges of said covering film.

4. The protective wrap as claimed in claim 1, the handheld computer having a first end and an opposite second end, the protective wrap further including:

said covering film in combination with two of said corner sheets and one said connecting sheet forming a first pocket which is shaped and dimensioned to receive the first end of the handheld computer, wherein said two corner sheets and said one connecting sheet are positionable to abut the lower surface of the handheld computer; and, said covering film in combination with the other two said corner sheets and the other said connecting sheet forming a second pocket which is shaped and dimensioned to receive the second end of the handheld computer, wherein said other two said corner sheets and said other connecting sheet are positionable to abut the lower surface of the handheld computer.

5. The protective wrap as claimed in claim 1, the protective wrap cooperating with a fixture for printing patterns, the fixture having four corner parts, the protective wrap further including:

said four corner wrapping sheets configured to wrap around the four corner parts of the fixture; and, said two connecting sheets configured to prevent said four corner wrapping sheets from turning inside out on the fixture.

6. The protective wrap as claimed in claim 1, the handheld computer having a heat dissipation hole, the protective wrap further including;

at least one of said two connecting sheets having an elongated through hole; and, said elongated thorough hole positionable adjacent to the heat dissipation hole.

7. A handheld computer wrapping system comprising:

a handheld computer having an upper surface upon which a keyboard is disposed and an opposite lower surface;

said handheld computer being one of a laptop computer and a tablet computer;

a covering film having two first side edges oppositely defined on said covering film, two second side edges oppositely defined on said covering film and four corners, and each of said corners defined between one of said first side edges and one of said second side edges;

said covering film positioned to cover said upper surface of said handheld computer;

four corner wrapping sheets disposed on a lower surface of said covering film and placed at said four corners of said covering film respectively;

said four corner sheets positioned to abut said lower surface of said handheld computer;

two connecting sheets disposed on said lower surface of said covering film, and each of said connecting sheets connected to and extending between two of said corner wrapping sheets that are disposed along said same second side edge of said covering film; and, said two connecting sheets positioned to abut said lower surface of said handheld computer.

8. The protective wrap as claimed in claim 7, wherein at least one of said two connecting sheets has a through hole formed through said connecting sheet.

9. The protective wrap as claimed in claim 8, wherein said through hole of said connecting sheet is elongated and extends between said two first side edges of said covering film.

10. The handheld computer wrapping system as claimed in claim 7 further including:

said handheld computer having a first end and an opposite second end;

said covering film in combination with two of said corner sheets and one said connecting sheet forming a first pocket which receives said first end of said handheld computer, wherein said two corner sheets and said one connecting sheet abut said lower surface of said handheld computer; and, said covering film in combination with the other two said corner sheets and said other said connecting sheet forming a second pocket which receives said second end of said handheld computer, wherein said two said corner sheets and said other connecting sheet abut said lower surface of said handheld computer.

11. The protective wrap as claimed in claim 7, the protective wrap cooperating with a fixture for printing patterns, the fixture having four corner parts, the protective wrap further including:

said four corner wrapping sheets configured to wrap around the four corner parts of the fixture; and, said two connecting sheets configured to prevent said four corner wrapping sheets from turning inside out on the fixture.

12. The handheld computer wrapping system as claimed in claim 7 further including;

said handheld computer having a heat dissipation hole;

at least one of said two connecting sheets having an elongated through hole; and, said elongated thorough hole disposed adjacent to said heat dissipation hole.

* * * * *

UNITED STATES PATENT AND TRADEMARK OFFICE
CERTIFICATE OF CORRECTION

PATENT NO. : 11,662,776 B2
APPLICATION NO. : 17/159472
DATED : May 30, 2023
INVENTOR(S) : Yu-Pao Chen It is certified that error appears in the above-identified patent and that said Letters Patent is hereby corrected as shown below:

In the Specification
Column 5, Line 27, insert --wrapping-- before sheets
Column 5, Line 30, insert --wrapping-- before sheets
Column 5, Line 34, insert --wrapping-- before sheets
Column 5, Line 37, insert --wrapping-- before sheets
Column 6, Line 12, insert --wrapping-- before sheets
Column 6, Line 13, after computer; insert the following two clauses:
--each of said computer wrapping sheets having two attaching edges;
said attaching edges positioned toward one of said first side edges of said covering film
and one of said second side edges of said covering film that define said corner at which said
corner wrapping sheet is placed and are attached to said covering film;--
Column 6, Line 21, replace "protective wrap" with --handheld computer wrapping system--
Column 6, Line 24, replace "protective wrap" with --handheld computer wrapping system--
Column 6, Line 33, insert --wrapping-- before sheets
Column 6, Line 35, insert --wrapping-- before sheets
Column 6, Line 39, insert --wrapping-- before sheets
Column 6, Line 42, insert --wrapping-- before sheets
Column 6, Line 44, replace "protective wrap" with --handheld computer wrapping system--

Signed and Sealed this
Twenty-fifth Day of July, 2023

Katherine Kelly Vidal
*Director of the United States Patent and Trademark Office*